3,291,591
METHODS AND COMPOSITIONS FOR PLANT
GROWTH ALTERATION
Stanley J. Strycker and Theodore W. Holmsen, Midland,
Mich., assignors to The Dow Chemical Company, Midland, Mich., a corporation of Delaware
No Drawing. Filed Sept. 10, 1963, Ser. No. 307,796
13 Claims. (Cl. 71—2.5)

This invention is concerned with growth alteration and modification, and is particularly directed to methods and compositions for modifying and altering the growth of plants and plant parts.

The method of the present invention comprises exposing a viable plant part to a triazepine compound of the formula

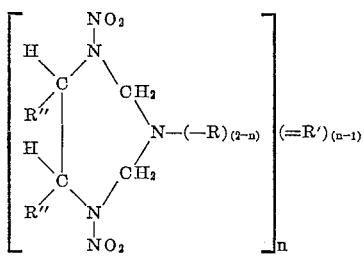

In the above and succeeding formulae, R represents a monovalent radical selected from the group consisting of allyl, benzyl, cyclohexyl, nitro, and alkyl being of from 1 to 18, inclusive, carbon atoms; R' represents alkylene being of from 1 to 10, inclusive, carbon atoms; each R" independently represents a member selected from the group consisting of hydrogen and methyl; and $n$ represents an integer of from 1 to 2, inclusive. Representative alkyl radicals include methyl, ethyl, propyl, isopropyl, butyl, secondary-butyl, tertiary-butyl, isobutyl, hexyl, tertiary-octyl, decyl, undecyl, pentadecyl, and octadecyl. Representative alkylene radicals include ethylene, propylene, tetramethylene, 2-ethyltrimethylene, hexamethylene, nonamethylene, 1,8-dimethyloctamethylene, and heptamethylene.

Illustrative of the compounds to be employed according to the present invention are 3-allylhexahydro-6,7-dimethyl-1,5-dinitro-1H-1,3,5-triazepine;
hexahydro-1,5-dinitro-3-propyl-1H-1,3,5-triazepine;
3-cyclohexylhexahydro-1,5-dinitro-1H-1,3,5-triazepine;
3-benzylhexahydro-6-methyl-1,5-dinitro-1H-1,3,5-triazepine;
3,3'-ethylenebis(hexahydro-1,5-dinitro-1H-1,3,5-triazepine);
hexahydro-3-methyl-1,5-dinitro-1H-1,3,5-triazepine;
3-cyclohexylhexahydro-6,7-dimethyl-1,5-dinitro-1H-1,3,5-triazepine;
3,3'-methylenebis(hexahydro-1,5-dinitro-1H-1,3,5-triazepine);
3-sec-butylhexahydro-6,7-dimethyl-1,5-dinitro-1H-1,3,5-triazepine;
hexahydro-3-isopropyl-1,5-dinitro-1H-1,3,5-triazepine;
3,3'-(1,6-dimethylhexamethylene)bis(hexahydro-6-methyl-1,5-dinitro-1H-1,3,5-triazepine);
3-(1,4-dimethylpentyl)hexahydro-1,5-dinitro-1H-1,3,5-triazepine;
hexahydro-1,5-dinitro-3-pentyl-1H-1,3,5-triazepine;
3-tert-butylhexahydro-1,5-dinitro-1H-1,3,5-triazepine;
3-decylhexahydro-6-methyl-1,5-dinitro-1H-1,3,5-triazepine;
3-dodecylhexahydro-1,5-dinitro-1H-1,3,5-triazepine;
3-hexadecylhexahydro-1,5-dinitro-1H-1,3,5-triazepine;
3,3'-tetramethylenebis(hexahydro-6,7-dimethyl-1,5-dinitro-1H-1,3,5-triazepine);
3-hexylhexahydro-1,5-dinitro-1H-1,3,5-triazepine;
3-octadecylhexahydro-1,5-dinitro-1H-1,3,5-triazepine;
3,3'-propylenebis(hexahydro-1,5-dinitro-1H-1,3,5-triazepine);
3,3'-decamethylenebis(hexahydro-1,5-dinitro-1H-1,3,5-triazepine);
hexahydro-1,5-dinitro-3-octadecyl-1H-1,3,5-triazepine;
3,3'-pentamethylenebis(hexahydro-1,5-dinitro-1H-1,3,5-triazepine);
3,3'-(1,2-diethyl-1,2-dimethylene)bis(hexahydro-1,5-dinitro-1H-1,3,5-triazepine); and
hexahydro-1,3,5-trinitro-1H-1,3,5-triazepine.

More particularly, it has been discovered that the exposure of a viable form of plants to the action of triazepine compound gives rise to different responses depending upon the nature of the plant, the stage of growth or maturity of the plant, and the dosage of triazepine compound at which the exposure is carried out. Thus, the application to plants, plant parts, and their habitats of a herbicidal amount of triazepine compound suppresses and inhibits the growth of seeds, emerging seedlings, and established vegetation. The application to plants of a lesser and growth-stimulant amount of triazepine compound imparts beneficial effects to the growth of the plants such as, for example, increased size of product, or of yield of crop; earlier plant maturation; improved qualitative content of plant parts, such as protein content in legumes and in members of the Gramineae family; delayed senescence; and the like.

It has further been discovered that the triazepine compounds are very toxic to fungal plants at dosages which are much lower than the dosages at which the triazepine compounds are toxic to terrestrial plants and their seeds, and are therefore adapted to be distributed in soil, or applied to seeds or the above-ground portions of plants. Such practice protects the plants, plant roots, and seeds from the attack of fungi and improves the emergence of seedlings as well as the crop yield without injury to the seed, crop plant or plant part.

The application of triazepine compound to plants may be made by contacting the compound with seeds, seedlings, established vegetation, roots, stems, flowers, fruits, plant storage structures, and the like, or by applying the compound to the soil. Additionally, the compounds can be applied in dormant applications to the woody surfaces of terrestrial plants or to orchard floor surfaces to obtain excellent controls of the overwintering spores of fungi. In further operations, the compounds can be included in inks, adhesives, soaps, high energy fuels, cutting oils, polymeric materials or in oil or latex paints to prevent mold and mildew, and the degradation of such products resulting from microbial attack. Also, the compounds can be distributed in textiles or cellulosic materials, or can be employed in the impregnation of wood and lumber to preserve and protect such products from the attack of the plant agents of rot, mold, mildew and decay.

The application to a viable plant part of a growth altering amount of triazepine compound is essential and critical for the practice of the present invention. The exact dosage to be supplied is dependent upon the plant, plant part, or habitat which is treated, the stage of growth of the plant or plant part, and, in many instances, the particular part of the plant or plant part to which the triazepine compound is applied. The triazepine compound can be applied to plants, plant parts and their habitats in herbicidal dosages. In foliar applications of herbicidal dosages, liquid compositions containing from about 4,000 or less to 20,000 or more parts of triazepine compound per million parts by weight of ultimate composition can be conveniently applied to plant surfaces. In the application to growth media of herbicidal dosages of triazepine compound, good results are obtained when the compound is supplied to the growth media in an amount of from about 5 to 300 parts or more by weight per million parts by weight of the media. Where the growth media is soil, good results are obtained when the triazepine compound is distributed therein at a rate of from about 20 or less to 300 pounds or more per acre and through such a cross section of the soil as to provide for the presence therein of triazepine compound in an amount of from 20 to 300 parts per million. In such application, it is desirable that the compound be distributed to a depth of at least 0.5 inch and at a substantially uniform dosage of at least 10 pounds per acre inch of soil. The weathering action of the sun, rain, and possibly the decomposition of the agents by the action of soil organisms, eventually reduces their concentration in soil, or other growth media.

When the present triazepine compound is employed in plant growth stimulating dosages, good results are obtained when the compounds are applied to plants and plant parts in dosages of from 0.001 or less to 20 or more pounds per acre. In other similar operations, liquid compositions containing from about 1 to 4,000 or more parts per million can be conveniently applied to the plant surfaces. In the treatment of seed to stimulate seedling growth and obtain improved yield of the plants produced by such seeds, good results are obtained when the seeds are treated with from about 1 to 250 grams (about 0.035 to 9 ounces) of compound per hundred pounds of seed.

In addition, the present triazepine compounds can be employed in fungicidal dosages. When the compounds are employed for the control of fungal plants on the above-ground portions of crop plants, the compounds are applied in amounts of from .003 to 25 pounds per acre to obtain excellent results without substantial injury to the crop plants. In such operations, liquid compositions containing from 3 to 5,000 parts per million conveniently can be applied to crop plant foliage to the point of run off. In applications to the furrows of seed rows for the suppression of seedling diseases attributable to fungal organisms, it is desirable that the compounds be distributed upon the surfaces of the furrow at a dosage of at least 0.1 pound per furrow soil surface in one planted acre. After such treatment, the furrow is seeded and the soil compacted about the seeds according to conventional practice.

In the protection and preservation of inks, adhesives, cutting oils, high energy fuels, paints, textiles, and paper, good results are obtained when the compounds are incorporated in such products in the amount of at least 0.0001 percent by weight. In the preservation of wood, excellent results are obtained when the compounds are incorporated by conventional treatment in the wood in the amount of at least 0.0001 pound per cubic foot of wood.

The method of the present invention can be carried out by exposing plants, plant parts, or their habitats to the action of the unmodified compounds. The present method also comprehends the employment of a liquid or dust composition containing one or more of the present compounds as an active component. In such usage, the active component is modified with one or a plurality of additaments or adjuvants for plant growth modification compositions, such as water or other liquid carriers, surface-active dispersing agents, and finely divided solids. Depending upon the concentration of active compound, such augmented compositions are adapted to be applied to the plants, plant parts, and their habitats, or to be employed as concentrates and subsequently diluted with additional inert carrier to produce the ultimate treating compositions. In compositions where the adjuvant or helper is a finely divided solid, a surface-active agent or a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods, wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity, such as water, acetone, isopropanol or 2-ethoxyethanol, in compositions to be applied to plants for plant stimulation and crop yield improvement.

The exact concentration of the active compound to be employed in the treating compositions is not critical and can vary considerably provided the required dosage of effective agent is supplied the plant, plant part, or its habitat. The concentration of the active agent in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active component can be present in a concentration of from about 0.5 to 98 percent by weight.

The quantity of the composition applied is not critical provided only that the required dosage of active component is applied in sufficient of the finished composition to cover adequately the plant, plant parts, or their habitats to be treated.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives or sorbitan esters, complex alcohols, mahogany soaps and the like.

In the preparation of dust compositions, the active component is dispersed in and on a finely divided solid which is non-reactive with the active agents such as talc, chalk, gypsum and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active component in compositions adapted to be applied to the organisms or their habitats. Also, such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to plants, plant parts, or their habitats in growth-modifying amounts in any convenient fashion, for example, with power dusters, boom and hand sprayers, and spray dusters. In another procedure, the agents or compositions containing the same are drilled into soil and further distributed therein in conventional procedures.

The following examples illustrate the best manner of employing the present invention, and, without more, will enable those skilled in the art to practice the present invention.

*Example 1*

Compositions containing the compounds of the present invention are prepared in various procedures. In one procedure, four parts by weight of one of the triazepine compounds, 0.08 part of sorbitan trioleate (Span 85) and 0.02 part of a sorbitan monolaurate polyoxyethylene derivative (Tween 80) are dispersed in forty milliliters of acetone to produce concentrate composition in the form of a water-dispersible liquid.

In another procedure, one of the triazepine compounds is formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of the active agents, 300 parts by weight of Nacconol NR and 300 parts by weight of Daxad No. 27 per million parts by weight of ultimate aqueous mixture. In this hexahydro - 1,5 - dinitro-3-pentyl-1H-1,3,5-triazepine, and 3-hexylhexahydro-1,5-dinitro-1H-1,3,5-triazepine, and the resulting concentrates dispersed in water to prepare aqueous compositions each containing an amount of one of the named active agents.

These compositions are employed for the treatment of seed beds of sandy loam soil of good nutrient content. Prior to the treatment, the soil is seeded with the seeds of peas (*Pisum sativum*) and beans (*Phaseolus vulgaris*). In the treating operations, the composition is applied as a soil drench and at a rate of about 0.434 acre inch of aqueous composition per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable effects upon the germination of the seeds and the growth of the seedlings.

Two weeks following the treating operations, the average height of the plants above the ground line in the treated seed beds is measured and compared with the average height of the plants in the untreated seed beds. At the time the measurements are taken, all of the treated and untreated seed beds support stands of healthy plants of the named plant species. The results of the measurements together with the agents, concentrations, and dosages at which they are employed are set forth in the following table.

| Test Compound | Concentration of Test Compound in Composition | Dosage of Test Compound | | Percent Greater Stem Elongation of Plants from Treated Soil than from Untreated Soil | |
|---|---|---|---|---|---|
| | | Pounds per acre | Parts per million by weight of soil | Peas | Beans |
| Hexahydro-1,5-dinitro-3-propyl-1H-1,3,5-triazepine | 0.0086 | 1 | 1.6 | 37 | 90 |
| | 0.0432 | 5 | 8 | 58 | 100 |
| 3-butylhexahydro-1,5-dinitro-1H-1,3,5-triazepine | 0.0086 | 1 | 1-6 | 29 | 50 |
| | 0.0432 | 5 | 8 | 50 | 177 |
| 3-cyclohexylhexahydro-1,5-dinitro-1H-1,3,5-triazepine. | 0.0086 | 1 | 1.6 | 41 | 84 |
| | 0.0432 | 5 | 8 | 50 | 133 |
| 3-benzylhexahydro-1,5-dinitro-1H-1,3,5-triazepine | 0.0432 | 5 | 8 | 50 | 133 |
| Hexahydro-3-methyl-1,5-dinitro-1H-1,3,5-triazepine | 0.0086 | 1 | 1.6 | 30 | 50 |
| | 0.0432 | 5 | 8 | 61 | 103 |
| 3-tert-butylhexahydro-1,5-dinitro-1H-1,3,5-triazepine. | 0.0086 | 1 | 1.6 | 70 | 70 |
| | 0.0432 | 5 | 8 | 50 | 60 |
| Hexahydro-1,5-dinitro-3-pentyl-1H-1,3,5-triazepine | 0.0086 | 1 | 1.6 | 77 | 56 |
| 3-(1,4-dimethylpentyl)hexahydro-1,5-dinitro-1H-1,3,5-triazepine. | 0.0086 | 1 | 1.6 | 39 | 56 |
| | 0.0432 | 5 | 8 | 100 | 56 |
| 3-hexylhexahydro-1,5-dinitro-1H-1,3,5-triazepine | 0.0086 | 1 | 1.6 | 27 | 33 |
| 3,3'-methylenebis(hexahydro-1,5-dinitro-1H-1,3,5-triazepine). | 0.0086 | 1 | 1.6 | 37 | 79 |
| 3,3'-ethylenebis(hexahydro-1,5-dinitro-1H-1,3,5-triazepine). | 0.0086 | 1 | 1.6 | 25 | 32 |
| | 0.0432 | 5 | 8 | 25 | 126 | manner, ballmilled compositions are prepared from all of the triazepine compounds illustrated above.

*Example 2*

Liquid compositions are prepared with hexahydro-1,5-dinitro-3-propyl-1H-1,3,5-triazepine,
3-butylhexahydro-1,5-dinitro-1H-1,3,5-triazepine,
3-cyclohexylhexahydro-1,5-dinitro-1H-1,3,5-triazepine,
3-benzylhexahydro-1,5-dinitro-1H-1,3,5-triazepine,
3-(1,4-dimethylpentyl)hexahydro-1,5-dinitro-1H-1,3,5-triazepine,
3,3'-methylenebis(hexahydro-1,5-dinitro-1H-1,3,5-triazepine), and
3,3'-ethylenebis(hexa-hydro-1,5-dinitro-1H-1,3,5-triazepine), in the ballmilling procedure described in Example 1 and each containing an amount of one of the named active agents.

Also, concentrate compositions are prepared as described in Example 1 from hexahydro-3-methyl-1,5-dinitro-1H-1,3,5-triazepine,
3-tert-butylhexahydro-1,5-dinitro-1H-1,3,5-triazepine,

*Example 3*

An aqueous composition containing 0.432 pound of 3,3' - ethylenebis(hexahydro - 1,5 - dinitro-1H-1,3,5 - triazepine) per 100 gallons of ultimate mixture is prepared in the manner, described as the ballmilling procedure, of Example 1. Also, concentrate compositions are prepared with hexahydro-1,5-dinitro-1H-1,3,5-triazepine and hexahydro-3-isopropyl-1,5-dinitro-1H-1,3,5-triazepine exactly in the manner as described in Example 1, and the compositions thereafter dispersed in water to produce aqueous compositions each containing 0.432 pound of one of the active agents per 100 gallons of ultimate mixture.

These aqueous compositions are employed for the treatment of soil and observations made for the control of the growth of seeds and emerging seedlings of peas (*Pisum sativum*). In these determinations, each composition is employed to treat seed beds which have been prepared and seeded with peas. In the treating operations, the composition is applied as a soil drench and at a rate of about 0.434 acre inch of aqueous composition per acre to supply a uniform dosage of about 50 pounds of the active agent per acre. This dosage corresponds to a concentration of about 80 parts by weight of the active agent per million parts by weight of soil. Other adjacent seed beds similarly seeded with peas are left untreated to serve as checks.

After about two weeks, the seed beds are examined to ascertain what percent kill and control of the growth of seeds and emerging seedlings of peas is obtained. The observations show that in each of the seed beds treated with one of the active compounds, there is obtained a 100 percent kill and control of the growth of the seeds and emerging seedlings of peas. At the time of the observations, the untreated check beds are found to support abundant stands of vigorously growing pea plants.

*Example 4*

Aqueous compositions each containing 1,000 by weight of one of the various triazepine compounds per million parts by weight of ultimate mixture are prepared according to the foregoing examples. These compositions are employed in post-emergent applications for the treatment of bean plants. At the time of the applications, the bean plants are from 2 to 4 inches in height. The treatments are carried out with conventional spraying equipment, the application being made to the point of run-off. Similar plots of the bean plants are left untreated to serve as checks.

Two weeks following the treating operations, the average height above the ground line of the treated bean plants is measured and compared with the average height above the ground line of the untreated bean plants. At the time that the measurements are taken, all of the treated and untreated plots support stands of bean plants in healthy condition. The triazepine test compounds employed and the results of the measurements are set forth in the following table:

| Test Compounds | Percent Greater Stem Elongation of Treated Bean Plants than of Untreated Bean Plants |
|---|---|
| Hexahydro-1,5-dinitro-3-propyl-1H-1,3,5-triazepine | 80 |
| 3-butylhexhydro-1,5-dinitro-1H-1,3,5-triazepine | 80 |
| 3-cyclohexylhexahydro-1,5-dinitro-1H-1,3,5-triazepine | 80 |
| 3-benzylhexahydro-1,5-dinitro-1H-1,3,5-triazepine | 80 |
| 3-tert-butylhexahydro-1,5-dinitro-1H-1,3,5-triazepine | 60 |
| 3-dodecylhexahydro-1,5-dinitro-1H-1,3,5-triazepine | 58 |
| 3-hyxadecylhexahydro-1,5-dinitro-1H-1,3,5-triazepine | 79 |
| 3-hexylhexahydro-1,5-dinitro-1H-1,3,5-triazepine | 79 |
| 3,3'-methylenebis(hexahydro-1,5-dinitro-1H-1,3,5-triazepine) | 133 |
| 3,3'-ethylenebis(hexahydro-1,5-dinitro-1H-1,3,5-triazepine) | 118 |
| Hexahydro-1,3,5-trinitro-1H-1,3,5-triazepine | 25 |

*Example 5*

Various of the triazepine compounds were dispersed in melted nutrient agar to produce bacteriological culture media each containing 500 parts by weight of one of the compounds per million parts by weight of medium. Such melted media were then poured into Petri dishes and allowed to solidify. The solidified agar surface in each Petri dish was inoculated with one species of plant organism. In a control operation, Petri dishes containing unmodified nutrient agar were each individually inoculated in identical procedures by mopping the agar surface with a swab from the broth culture of one of the organisms.

After three days incubation at 30° C. the agar surface in each Petri dish was examined to determine what percent kill and inhibition of the organism in that Petri dish had been obtained. The triazepine compounds employed and the results of the examination are set forth in the following table:

| Test Compound | Percent Kill and Inhibition of Growth of Organism | |
|---|---|---|
| | Aerobacter aerogenes | Pseudomonas aeruginosa |
| Hexahydro-1,5-dinitro-3-propyl-1H-1,3,5-triazepine | 100 | 100 |
| 3-butyl-hexahydro-1,5-dinitro-1H-1,3,5-triazepine | 100 | 100 |
| 3-benzylhexahydro-1,5-dinitro-1H-1,3,5-triazepine | 100 | 100 |
| Hexahydro-3-methyl-1,5-dinitro-1H-1,3,5-triazepine | 100 | 100 |
| Hexahydro-3-isopropyl-1,5-dinitro-1H-1,3,5-triazepine | 100 | 100 |
| 3-tertiary-butylhexahydro-1,5-dinitro-1H-1,3,5-triazepine | 100 | 100 |
| Hexahydro-1,5-dinitro-3-pentyl-1H-1,3,5-triazepine | 100 | 100 |
| 3-(1,4-dimethylpentyl)hexahydro-1,5-dinitro-1H-1,3,5-triazepine | 100 | 100 |
| 3-hexadecylhexahydro-1,5-dinitro-1H-1,3,5-triazepine | 100 | 100 |
| 3,3'-methylenebis(hexahydro-1,5-dinitro-1H-1,3,5-triazepine) | 100 | 100 |
| 3,3'-ethylenebis(hexahydro-1,5-dinitro-1H-1,3,5-triazepine) | 100 | 100 |
| 3-hexylhexahydro-1,5-dinitro-1H-1,3,5-triazepine | 100 | 100 |

Following the incubation period, each of the check Petri dishes was found to support a heavy growth of the test organisms.

*Example 6*

In procedures essentially the same as those employed in Example 5, 3-dodecylhexahydro-1,5-dinitro-1H-1,3,5-triazepine is employed for the control of various plant organisms. In such operations, bacteriological culture media containing 50 parts by weight of the compound per million parts by weight of medium are employed for the control of *Aerobacter aerogenes, Salmonella typhosa,* and *Staphylococcus aureus.* Also bacteriological culture media containing 250 parts by weight of the compound per million parts by weight of medium are employed for the control of *Aspergillus terreus* and *Pullularia pullulans.* The compound is found to give 100 percent kill and inhibition of the growth of each of the organisms.

The compounds of the present invention are prepared in known procedures which comprise reacting together a N,N'-dinitroethylenediamine compound of the formula

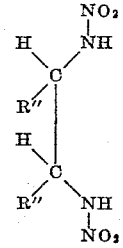

formaldehyde in any of its various forms, and an amine compound having the formula $$[H_2N-(-R)_{(2-n)}]_n(=R')_{(n-1)}$$

The reaction is conveniently carried out in the presence of an inert liquid reaction medium, such as, for example, benzene, chloroform, tetrahydrofuran, ethyl acetate, or excess aqueous formaldehyde. Preferably, when $n$ represents one, the reactants are employed in amounts which represent one molecular proportion of the N,N'-dinitroethylenediamine compound, two molecular proportions of formaldehyde, and one molecular proportion of amine compound, and, when $n$ represents two, amounts which represent two molecular proportions of the N,N'-dinitroethylenediamine compound, four molecular proportions of formaldehyde, and one molecular proportion of amine compound. The reaction goes forward at temperatures of from 0° to 100° C. with the production of the desired product in good yield and water as byproduct.

The trinitrotriazepine compound to be employed according to the present invention is prepared in a known method which comprises reacting together 3,3'-methylene-bis(hexahydro-1,5-ditnitro-1H-1,3,5-triazepine) and a nitrating agent such as fuming nitric acid.

In the present specification and claims, the term "viable plant part" is inclusive of stems, branches, roots, root-like structures, foliage, flowers, fruit, seeds, storage structures, bulbs, corms, spores, hyphae, and mycelia of plants.

We claim:

1. Method of altering the growth of plants which comprises exposing a viable plant part to a growth altering amount of triazepine compound of the formula

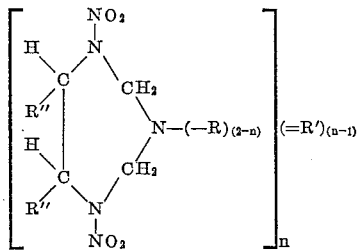

wherein R represents a monovalent radical selected from the group consisting of allyl, benzyl, cyclohexyl, nitro, and alkyl being of from 1 to 18, inclusive, carbon atoms; R' represents alkylene being of from 1 to 10, inclusive, carbon atoms; each R" independently represents a member selected from the group consisting of hydrogen and methyl; and $n$-represents an integer of from 1 to 2, inclusive.

2. A plant growth altering composition comprising from 5 to 98 percent by weight of an active ingredient in admixture with an inert finely divided solid and a surface active agent, the active ingredient being triazepine compound of the formula

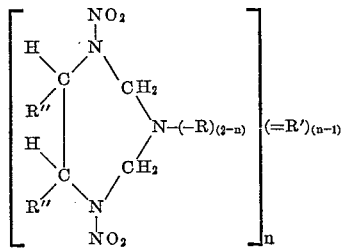

wherein R represents a monovalent radical selected from the group consisting of allyl, benzyl, cyclohexyl, nitro, and alkyl being of from 1 to 18, inclusive, carbon atoms; R' represents alkylene being of from 1 to 10, inclusive, carbon atoms; each R" independently represents a member selected from the group consisting of hydrogen and methyl; and $n$-represents an integer of from 1 to 2, inclusive.

3. The composition which comprises an aqueous dispersion of the composition claimed in claim 2, the active ingredient in such composition being present in the amount of at least 0.0001 percent by weight.

4. Method of claim 1 wherein the triazepine compound is hexahydro-1,3,5-trinitro-1H-1,3,5-triazepine.

5. Method of claim 1 wherein the triazepine compound is 3-allylhexahydro-1,5-dinitro-1H-1,3,5-triazepine.

6. Method of claim 1 wherein the triazepine compound is 3,3' - methylenebis(hexahydro - 1,5 - dinitro-1H-1,3,5-triazepine).

7. Method of claim 1 wherein the triazepine compound is hexahydro-3-methyl-1,5-dinitro-1H-1,3,5-triazepine.

8. Method of claim 1 wherein the triazepine compound is 3,3' - ethylenebis(hexahydro - 1,5 - dinitro - 1H - 1,3,5-triazepine).

9. Composition of claim 2 wherein the triazepine compound is hexahydro-1,3,5-trinitro-1H-1,3,5-triazepine.

10. Composition of claim 2 wherein the triazepine compound is 3-allylhexahydro-1,5-dinitro-1H-1,3,5-triazepine.

11. Composition of claim 2 wherein the triazepine compound is 3,3'-methylenebis(hexahydro-1,5-dinitro-1H-1,3,5-triazepine).

12. Composition of claim 2 wherein the triazepine compound is hexahydro - 3 - methyl-1,5-dinitro-1H-1,3,5-triazepine.

13. Composition of claim 2 wherein the triazepine compound is 3,3'-ethylenebis(hexahydro-1,5-dinitro-1H-1,3,5-triazepine).

References Cited by the Examiner

Chapman: "Chemical Abstract," vol. 44, 1410 to 1412.

Frankel: Chemical Abstract, vol. 56, Col. 1551f, 1962, original article, 1961.

Myers et al.: "Chemical Abstract," vol. 43, 9073 to 9074 (1949).

LEWIS GOTTS, Primary Examiner.

JAMES O. THOMAS, JR., Examiner.

A. J. ADAMCIK, Assistant Examiner.